(12) United States Patent
Kim

(10) Patent No.: US 6,393,011 B1
(45) Date of Patent: May 21, 2002

(54) RECEIVING CIRCUIT OF MOBILE COMMUNICATION TERMINAL HAVING FEED FORWARD LINEARIZER

(75) Inventor: Sung-Uk Kim, Songnam-shi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/222,462

(22) Filed: Dec. 29, 1998

(30) Foreign Application Priority Data

Dec. 29, 1997 (KR) .............................................. 97-76021

(51) Int. Cl.[7] .............................. H04B 7/216; H04B 1/10
(52) U.S. Cl. ....................... 370/342; 370/335; 455/296; 455/63; 375/346
(58) Field of Search ................................ 370/335, 342; 375/136, 147, 148, 284, 285, 346, 349, 350; 330/129, 149; 327/551; 455/296, 295, 278.1, 303, 304, 306, 310, 501, 63, 67.3

(56) References Cited

U.S. PATENT DOCUMENTS 5,617,060 A * 4/1997 Wilson ........................ 330/129
5,675,613 A * 10/1997 Uwano ........................ 375/346
5,826,181 A * 10/1998 Reed ........................... 455/296
5,877,653 A * 3/1999 Kim ............................ 330/149

* cited by examiner

Primary Examiner—Wellington Chin
Assistant Examiner—Steven Nguyen
(74) Attorney, Agent, or Firm—Dilworth & Barrese, LLP

(57) ABSTRACT

A receiving circuit of a mobile communication terminal which can prevent the deterioration of receiving sensitivity caused by an intermodulation product signal. The receiving circuit includes a front-end receiver, a controller, and a feed forward linearizer having an intermodulation product generator, a phase shifter and a variable attenuator. The feed forward linearizer generates an internodulation product signal in a feed forward path having the same magnitude as an intermodulation product signal in a main path, generated from the front-end receiver, but with a 180° phase difference. As a result, the intermodulation product signals are eliminated via vectorial addition of the signals in the main and feed forward paths.

8 Claims, 3 Drawing Sheets

RECEIVING CIRCUIT OF MOBILE COMMUNICATION TERMINAL HAVING FEED FORWARD LINEARIZER

BACKGROUND OF THE INVENTION

1. Field of the Invention

The present invention relates to a receiving circuit of a mobile communication terminal, and more particularly, to a circuit for preventing the deterioration of receiving sensitivity caused by an intermodulation (IMD) product signal.

2. Description of the Related Art

An intermodulation product signal generated from a non-linear active element often appears within the frequency band of a Code Division Multiple Access (CDMA) receive signal. This IMD product signal lowers the receiving sensitivity of a mobile communication terminal such as a CDMA or Personal Communication Service (PCS) terminal.

FIG. 1 is a block diagram of a conventional receiving circuit of a mobile communication terminal using a CDMA system. The receiving circuit includes a front-end receiver 116, an intermediate frequency (IF) band pass filter (BPF) 110, an automatic gain controller (AGC) 112, and a demodulator 114. The front-end receiver 116 has a low-noise amplifier (LNA) 100, a radio frequency (RF) band pass filter (BPF) 102, a mixer 104 for converting an input RF signal into an IF signal, a local oscillator 106 for supplying an appropriate frequency to mixer 104, and an IF amplifier 108 for amplifying the IF signal generated from mixer 104. The IF BPF 110 passes only a specific band of the IF signal generated from front-end receiver 116. AGC 112 automatically controls the gain of the IF signal passing through BPF 110. Demodulator 114 demodulates the IF signal generated from AGC 112.

FIG. 2 illustrates a frequency spectrum of an intermodulation product signal generated during reception of a CDMA receive signal through front-end receiver 116 shown in FIG. 1. A multi-tone interference signal is received together with the CDMA receive signal. This interference signal is intermodulated while passing through the front end receiver 116, thereby producing intermodulation product signals (IMD products) that fall within the band of the CDMA receive signal. These IMD products, which are typically third order and fifth order products, act as noise in the CDMA receive signal.

Receiving sensitivity of a CDMA mobile communication terminal can be improved by employing a technique for reducing the intermodulation product signal serving as noise in the CDMA receive signal. This technique is very important to the performance of a CDMA mobile communication terminal. As one example of such a technique, a variable attenuator is employed. The attenuator is installed at the front end receiver 116 of the receiving circuit and attenuates an interference signal by a predetermined amount controlled by a controller. As a second example, a low noise amplifier having a variable gain is used. If an interference signal is received, an intermodulation product signal can be prevented from being generated at the next stage by reducing the gain of the low noise amplifier, so that it operates in a more linear region. In a third technique, the power of the local oscillating signal driving the mixer is varied. As the power of the local oscillating signal driving the mixer increases, an intermodulation product signal generated from the mixer decreases in amplitude. In yet another technique, the driving current of the low noise amplifier is controlled. As the driving current for operating the low noise amplifier increases, the amplitude of the intermodulation product signal decreases.

One problem with the variable attenuator approach is that the variable attenuator attenuates both the interference signal and the desirable CDMA information signal. Therefore, the receiving sensitivity of the receiving circuit of the mobile communication terminal is lowered. If the low noise amplifier with variable gain is used, the input/output impedance of the amplifier varies as the gain decreases, thereby deteriorating circuit performance. Moreover, there is the possibility of the circuit oscillating as a result of such gain variation. In the third example of controlling the power of the local oscillator, the attenuated range of the intermodulation product signal is narrow. In particular, the intermodulation product signal generated from the low noise amplifier positioned before the mixer can not be attenuated with this method. In the fourth example of controlling the driving current for operating the low noise amplifier, the attenuated range of the intermodulation product signal is narrow and there is a strong possibility that the circuit within the next stage will oscillate.

SUMMARY OF THE INVENTION

It is therefore an object of the present invention to provide a circuit for reducing or effectively eliminating an intermodulation product signal generated from a front-end receiver of a receiving circuit.

In an illustrative embodiment of the invention, there is provided a receiving circuit of a mobile communication terminal including a front-end receiver for receiving a CDMA signal from an antenna and converting the CDMA signal into an intermediate frequency signal. A feed forward linearizer includes an intermodulation product generator for generating essentially only an intermodulation product signal of an interference signal contained in the CDMA signal, a phase shifter for phase shifting the intermodulation product signal generated by the intermodulation product generator, and a variable attenuator for adjusting the amplitude of the intermodulation product signal generated by the phase shifter. A controller controls a phase shifter so that a phase difference between the intermodulation product signal generated from the intermodulation product generator and an intermodulation product signal generated from the front-end receiver may be 180°. The controller also controls the variable attenuator so that these intermodulation product signals may have the same magnitude. The IMD products are then essentially canceled via a combiner.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, numerous specific details are set forth to provide a more thorough understanding of the present invention. It will be apparent, however, to one skilled in the art that the present invention may be practiced without these specific details. Well known functions and configurations are not described in detail so as not to obscure the present invention.

Figure 1:
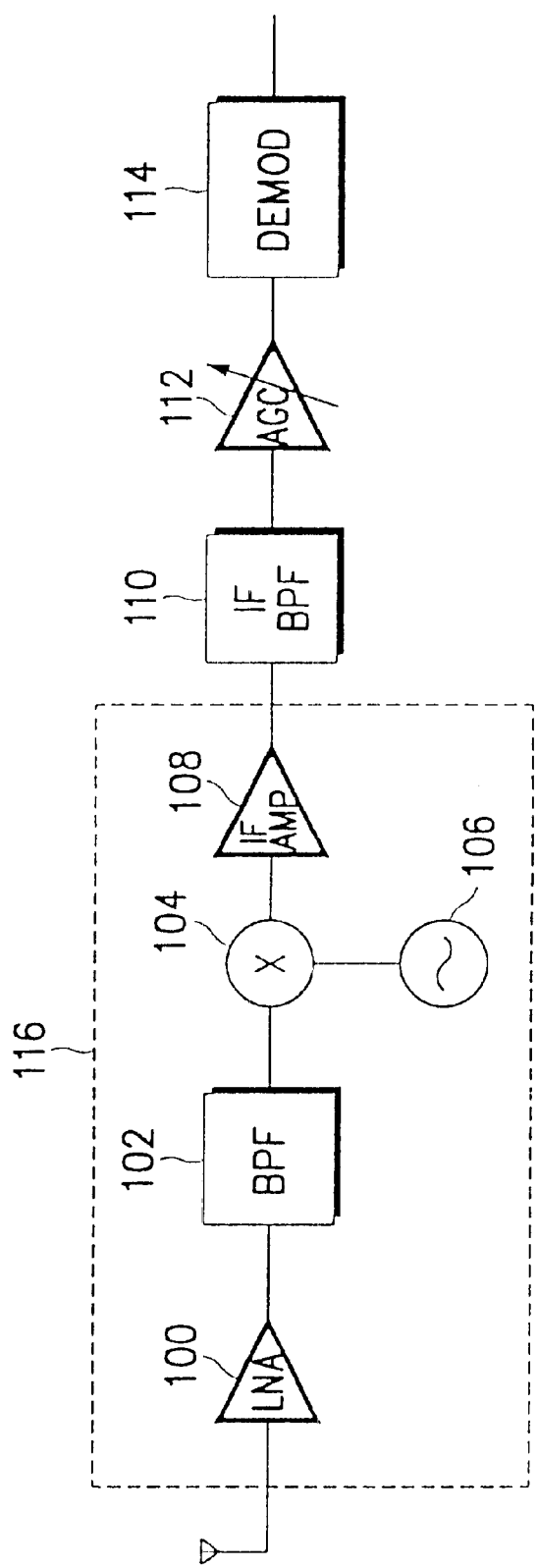
FIG. 1 is a block diagram of a conventional receiving circuit of a mobile communication terminal.
Figure 2:
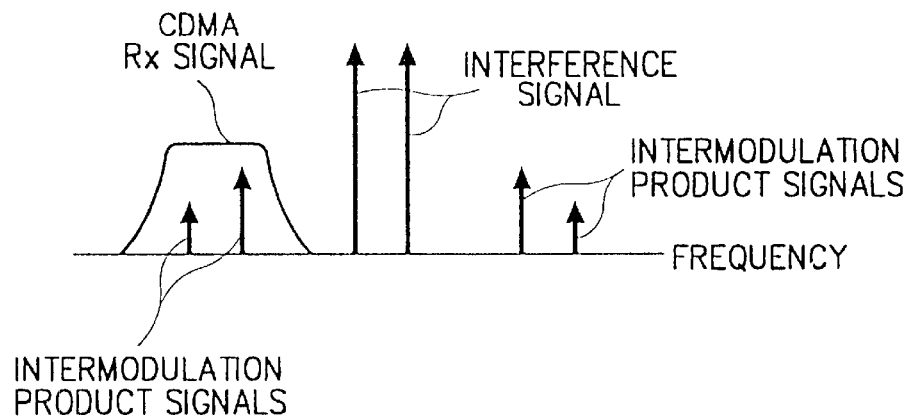
FIG. 2 is a diagram illustrating a frequency spectrum of an intermodulation product signal generated within a CDMA receive signal band through a front-end receiver shown in FIG. 1.
Figure 3:
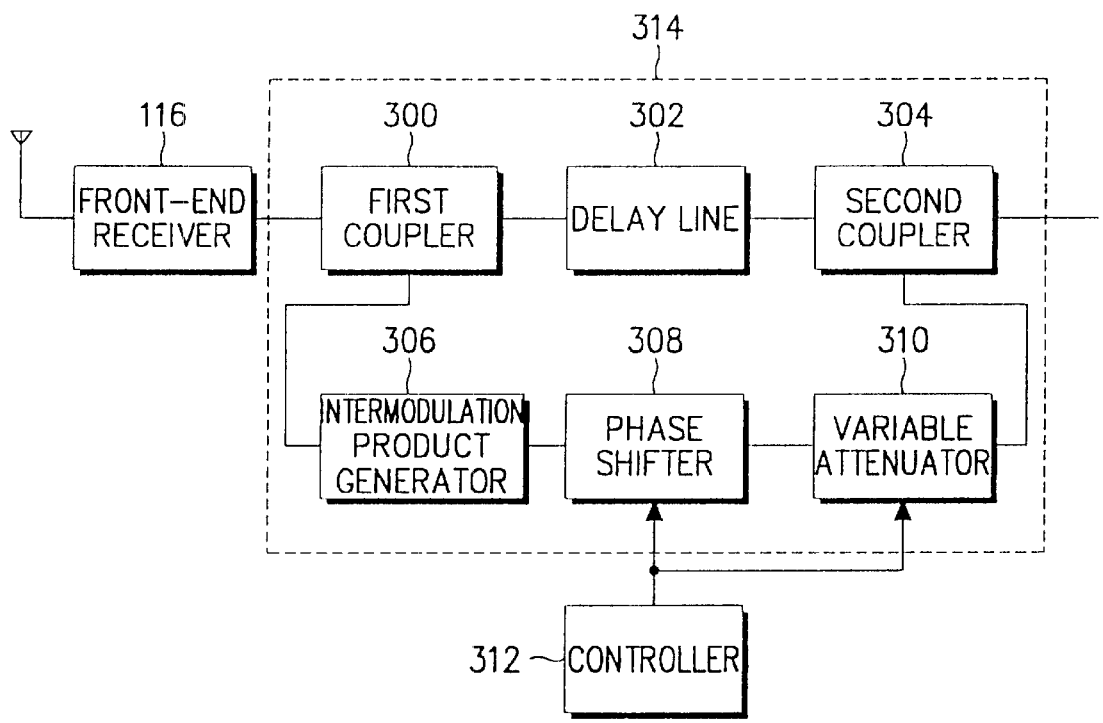
FIG. 3 is a block diagram of a receiving circuit of a mobile communication terminal having a feed forward linearizer according to a preferred embodiment of the present invention.
Figure 4:
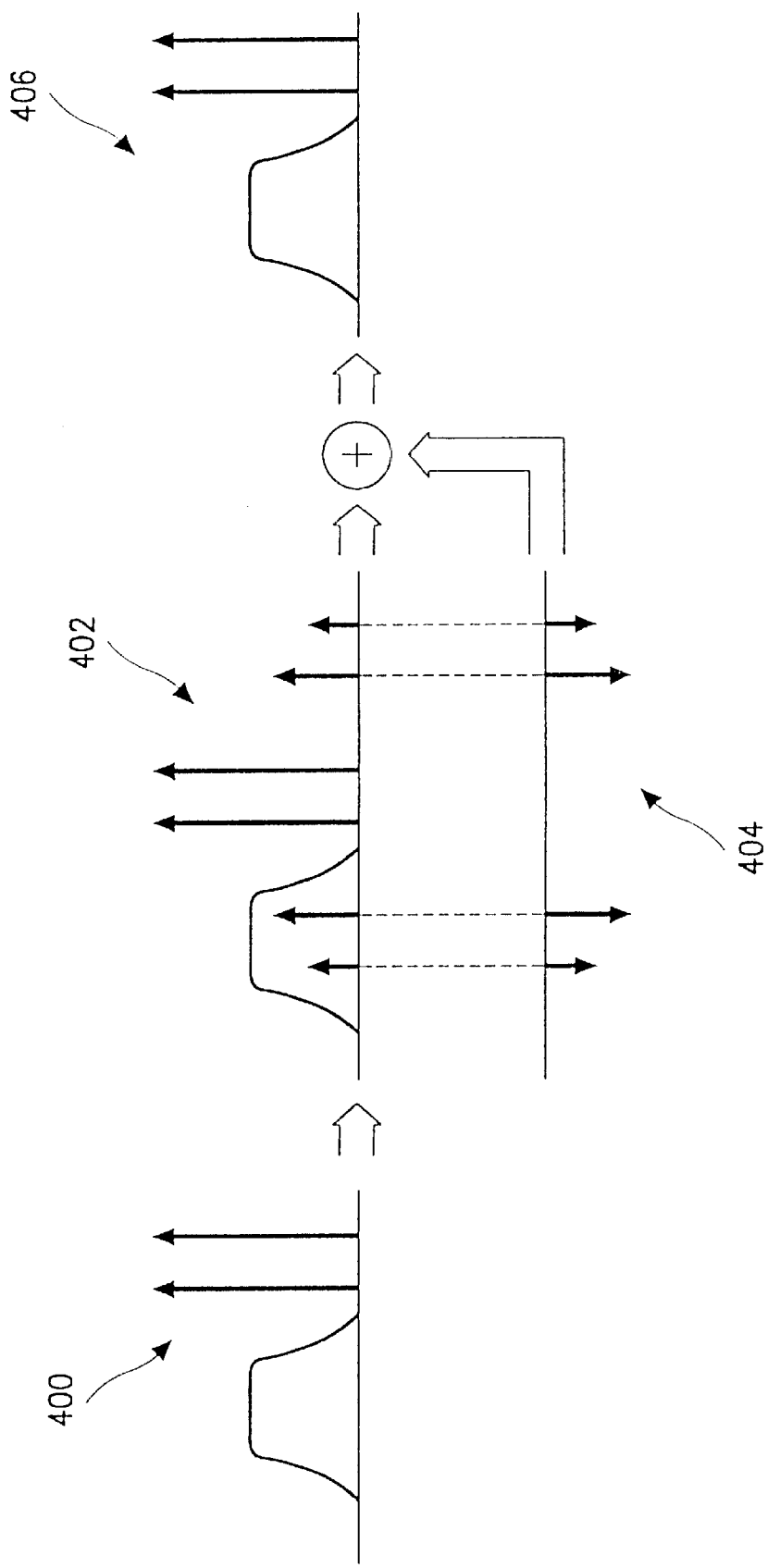
FIG. 4 is a diagram illustrating frequency spectrums of signals generated in different portions of the receiving circuit of FIG. 3.

Referring now to the block diagram of FIG. 3, front-end receiver 116 receives a CDMA signal from an antenna and converts the received signal into an IF signal. A multi-tone interference signal received by receiver 116 together with the CDMA signal, is also frequency converted and forms part of the IF signal. In this case, intermodulation products are generated within the CDMA receive signal band due to the nonlinearity of the front-end receiver 116. These IMD products are due to beating or mixing of the interference signal tones with one another. This IMD product generation is illustrated in FIG. 4. Exemplary frequency spectrums of input and output signals of the front-end receiver 116 are designated as reference numerals 400 and 402, respectively. The first spectrum 400 includes the CDMA signal and the interference signal. In the second spectrum 402, the intermodulation products generated during frequency conversion appear within the CDMA receive signal band. (Higher IMD products are also shown which appear outside the CDMA receive band.)

With continuing reference to FIG. 3, front-end receiver 116 is coupled to a feed forward linearizer 314 including components 300 to 310. The IF signal generated from the front-end receiver 116 is applied through the main path of a first directional coupler 300 to a delay line 302. The IF signal is also applied through the coupled path of coupler 300 to an intermodulation product generator 306 of feed forward linearizer 314. IMD product generator 306 generates only intermodulation products with respect to the input signal applied thereto. Thus, in this case, IMD product 306 generator generates IMD products due to beating or mixing of the interference signal tones with one another. Consequently, the IMD products generated by generator 306 are at the same frequencies as the IMD products contained within the output signal of front-end receiver 116. (It is noted that additional IMD products may be formed due to beating of the interference signal with, the IMD products already contained within the IF signal. However, these will be very low in amplitude, and may be avoided via suitable filtering prior to amplifying the input signal.)

Suitable configurations for IMD product generator 306 are known to those skilled in the art. Typically, such an IMD product generator includes a non-linear amplifier that amplifies the input signal so as to produce an amplified signal containing both a main signal and IMD products. The main signal is filtered out so as to leave only IMD products, typically by employing a feed forward arrangement to subtract a coupled portion of the amplified signal from a coupled portion of the input it signal so that only IMD products remain.

The intermodulation product signal generated from the intermodulation product generator 306 is applied to a phase shifter 308, which phase shifts the signal by an amount sufficient to achieve subsequent cancellation of the IMD products output by receiver 116. Typically, this is accomplished by phase shifting the output signal of generator 306 so that it is 180° out of phase with respect to the IMD product signal of receiver 116 at a common circuit location (in this case, at second coupler 304). The phase-shifted intermodulation product signal is applied to a variable attenuator 310 so as to have the same magnitude as the intermodulation product signal generated from the front-end receiver 116. A controller 312 controls the variable phase shifter 308 and the variable attenuator 310 so that the intermodulation product signals generated from the front-end receiver 116 and the intermodulation product generator 306 may have the phase difference of 180° and the same magnitude.

A third spectrum 404 shown in FIG. 4 is a frequency spectrum of the intermodulation product signal generated from variable attenuator 310 via intermodulation product generator 306 and phase shifter 308. As shown, the signal generated from variable attenuator 310 has the phase difference of 180° and the same magnitude as the intermodulation product signal produced by front-end receiver 116. More particularly, the main path signal output by first coupler 300 is delayed by a delay line 302. The signal generated from the variable attenuator 310 is applied to the coupled port of coupler 304. As a result, it is vectorially added to the delayed output signal of delay line 302 through second directional coupler 304. In this case, the intermodulation product signal generated from variable attenuator 310 and the IMD product signal generated from delay line 302 cancel out, as shown by a fourth spectrum 406 in FIG. 4. That is, the spectrum 406, which is devoid of IMD products within the CDMA receive band, appears at the main path output port of coupler 304. Consequently, the deterioration of receiving sensitivity due to the IMD products previously within the CDMA receive signal band, is prevented.

As will be appreciated by those skilled in the art, while in the preferred embodiment above, the IMD product signal output by variable attenuator 310 (and provided to coupler 304) is designed to be equal in magnitude and 180° out of phase with the output signal of delay line 302, this is only the case for certain configurations of second coupler 304— e.g., for a 3dB in-phase coupler design. If a hybrid coupler is used for coupler 304, for example, a 90° phase difference between the signals input to the coupler would be needed. Also, an unequal power coupler could be employed, in which case the magnitude of the two signals would typically not be equal. Thus, in general, the magnitude and phase of the IMD product signal output by variable attenuator 310 should be of sufficient values to achieve substantial cancellation of the IMD products via the combining device (second coupler 304).

The use of the controller 312 to control adjustment of the precise phase and amplitude of the IMD product signal allows for more effective cancellation of the IMD products in a practical environment. Since, in the real world, the interference signals and the resulting IMD products are variable parameters, controller 312 ensures that these undesirable IMD products are substantially eliminated.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A receiving circuit of a mobile communication terminal, comprising:
   a front-end receiver for receiving a Code Division Multiple Access (CDMA) signal from an antenna and converting said CDMA signal into an intermediate frequency (IF) signal;
   a feed forward linearizer having: an intermodulation (IMD) product generator for generating, essentially, only an intermodulation product signal of an interference signal received by said antenna; a phase shifter for phase shifting of the intermodulation product signal generated from said intermodulation product generator; and a variable attenuator for adjusting magnitude of the intermodulation product signal; and a controller for controlling said phase shifter so that a phase difference between the intermodulation product signal generated from said intermodulation product generator and an intermodulation product signal generated from said front end receiver may be 180°, and controlling said variable attenuator so that these intermodulation product signals may have the same magnitude, so as to achieve cancellation of the intermodulation product signal contained within said IF signal.

2. The receiving circuit of claim 1, wherein said feed forward linearizer further includes:

a first coupler having an input coupled to said front-end receiver and a coupled path coupled to said IMD product generator; and a second coupler having an input coupled to an output path of said first coupler, and a coupled path coupled to a feed forward path containing said variable attenuator and said phase shifter, so as to vectorially combine the signals applied thereto from said output path and feed forward path.

3. A receiving circuit of a mobile communication terminal having a front-end receiver for receiving a Code Division Multiple Access (CDMA) signal from an antenna and converting said CDMA signal into an intermediate frequency (IF) signal, wherein an interference signal received by said antenna results in the generation of intermodulation distortion (IMD) products by said front-end receiver which appear within the frequency band of said CDMA signal, and which form part of said IF signal after conversion by said receiver, said receiving circuit further comprising:

a feed forward linearizer having: an intermodulation (IMD) product generator for generating an IMD product signal having IMD products at the same frequencies as IMD products contained within said IF signal; a phase shifter for shifting the phase of said IMD product signal; a variable attenuator for attenuating said IMD product signal; and a combiner for vectorially combining said phase shifted and attenuated IMD product signal with said IF signal so as to essentially cancel IMD products of said IF signal and said IMD product signal; and a controller for controlling the amount of phase shift provided by said phase shifter and the amount of attenuation provided by said variable attenuator.

4. The receiving circuit of claim 3, wherein said feed forward linearizer further includes a first coupler having an input coupled to said front-end receiver, a coupled path coupled to said IMD product generator, and an output path coupled to an input of a delay line; and said combiner comprises a second coupler having an input coupled to an output of said delay line and a coupled path coupled to said variable attenuator.

5. The receiving circuit of claim 3, wherein said controller controls said variable attenuator so as to provide an output signal of said variable attenuator with IMD products of about the same magnitude as IMD products of said IF signal, with a 180° phase difference.

6. A mobile communication terminal including a receiving circuit having a front-end receiver for receiving a Code Division Multiple Access (CDMA) signal from an antenna and converting said CDMA signal into an intermediate frequency (IF) signal, wherein an interference signal received by said antenna results in the generation of intermodulation distortion (IMD) products by said front-end receiver which appear within the frequency band of said CDMA signal and which form a part of said IF signal after conversion by said receiver, said receiving circuit further comprising:

a feed forward linearizer having: an intermodulation (IMD) product generator for generating an IMD product signal having IMD products at the same frequencies as IMD products contained within said IF signal; a phase shifter for shifting the phase of said IMD product signal; and a variable attenuator for attenuating said IMD product signal; and a combiner for vectorially combining said phase shifted and attenuated IMD product signal with said IF signal so as to essentially cancel IMD products of said IF signal and said IMD product signal; and a controller for controlling the amount of phase shift provided by said phase shifter and the amount of attenuation provided by said variable attenuator.

7. The mobile communication terminal of claim 6, wherein said feed forward linearizer further includes a first coupler having an input coupled to said front-end receiver, a coupled path coupled to said IMD product generator, and an output path coupled to an input of a delay line; and said combiner comprises a second coupler having an input coupled to an output of said delay line and a coupled path coupled to said variable attenuator.

8. The mobile communication terminal of claim 6, wherein said controller controls said variable attenuator so as to provide an output signal of said variable attenuator with IMD products of about the same magnitude as IMD products of said IF signal, with a 180° phase difference.

* * * * *